(12) United States Patent
McNabb

(10) Patent No.: US 6,644,716 B1
(45) Date of Patent: Nov. 11, 2003

(54) PORTABLE EXTERNAL COVER APPARATUS AND METHOD

(76) Inventor: James David McNabb, 1411 Mohle Dr., Austin, TX (US) 78703-1933

( * ) Notice: Subject to any disclaimer, the term of this patent is extended or adjusted under 35 U.S.C. 154(b) by 0 days.

(21) Appl. No.: 10/192,966

(22) Filed: Jul. 10, 2002

(51) Int. Cl.[7] ................................................. B60J 11/00
(52) U.S. Cl. ...................................... 296/136; 296/95.1
(58) Field of Search ................................ 296/95.1, 136; 160/370.21; 150/166

(56) References Cited

U.S. PATENT DOCUMENTS

| | | | | | |
|---|---|---|---|---|---|
| 2,716,433 | A | * | 8/1955 | Rawlings | |
| 3,763,908 | A | * | 10/1973 | Norman | 150/166 |
| 4,004,440 | A | * | 1/1977 | Dreyer | 70/15 |
| 4,184,501 | A | * | 1/1980 | Johnson | |
| 4,355,839 | A | * | 10/1982 | Rosen | 296/136 |
| 4,598,883 | A | * | 7/1986 | Suter | 150/166 |
| 4,726,406 | A | * | 2/1988 | Weatherspoon | 296/136 |
| 4,867,216 | A | * | 9/1989 | McKee | 150/166 |
| 4,938,522 | A | * | 7/1990 | Herron et al. | 296/136 |
| 4,948,191 | A | * | 8/1990 | Cao | 296/95.1 |
| 4,952,007 | A | * | 8/1990 | Shahrokh | 296/95.1 |
| 5,275,460 | A | * | 1/1994 | Kraus | 296/136 |
| 5,282,587 | A | * | 2/1994 | Rodyniuk et al. | 150/166 |
| 5,343,915 | A | * | 9/1994 | Newsome | 296/136 |
| 5,490,707 | A | * | 2/1996 | De La Cruz | 296/95.1 |
| 5,611,501 | A | * | 3/1997 | Crandley | 150/166 |
| 5,915,399 | A | * | 6/1999 | Yang | 296/136 |
| 6,070,629 | A | * | 6/2000 | Whiteside | 296/136 |
| 6,415,832 | B1 | * | 7/2002 | Ricks | 150/166 |
| 6,468,612 | B1 | * | 10/2002 | Symonds | 296/136 |
| 6,485,086 | B2 | * | 11/2002 | McGrath, Jr. | 296/136 |
| 6,491,335 | B1 | * | 12/2002 | Cohill | 296/136 |

* cited by examiner

Primary Examiner—Stephen T. Gordon
Assistant Examiner—Hilary Gutman
(74) Attorney, Agent, or Firm—J. Nevin Shaffer, Jr.

(57) ABSTRACT

A portable external cover apparatus and method includes, in a vehicle with at least one window, a central connection section. A securing device is connected to the central connection section for securing the central connection section to the vehicle. A reinforcement device is provided in the securing device for preventing removal of the securing device from the vehicle. At least one cover extension is connected to the central connection section for covering the at least one window. A collapsible, shape maintaining rim is attached to the cover extension.

20 Claims, 4 Drawing Sheets

PORTABLE EXTERNAL COVER APPARATUS AND METHOD

FIELD OF THE INVENTION

This invention relates to a portable external cover apparatus and method. In particular, the invention relates to a portable external cover apparatus and method for vehicles with at least one window.

BACKGROUND OF THE INVENTION

Vehicles of all types, including in particular automobiles and trucks, have windows. Typically there are, at a minimum, front and rear windows as well as side windows. When it comes to protecting vehicle windows from sunlight, manufacturers provide minimal help. Usually, vehicles come equipped merely with interior sun visors. Some vehicles come with window tinting. In hot, sunny climates, these manufacturer equipped vehicles are found wanting.

A cottage industry of sorts has sprung up for the purpose of reducing the impact of light on unprotected vehicle windows. The primary focus of these devices is to reduce the temperature rise in automobiles parked in the direct sunlight. Some of these devices are permanent in nature, such as micro-louvers permanently fixed to the inside of the windows (such as the side windows of large station wagons, trucks, and the like). There are others that are more temporary in design and are installed, such as with suction cups, to the inside of side windows either in a fixed position or in a movable shade that rolls up and down like a home window shade.

Perhaps the most common prior art directed to solving the problem of heating by light directed through windows of vehicles are portable shades that are installed against the inside of the windshield of the vehicle and retained there by folding down the windshield sun visors of the automobile. These devices typically are accordion type foldable panels of lightweight reflective material.

Virtually all of the devices known in the art are installed inside the automobile. Their effectiveness in preventing heating of the interior of vehicles is greatly reduced by virtue of the fact that the sun's heat still enters the vehicle. That is, these prior art interior devices have reflective surfaces that attempt to reflect the radiation back out through the same window through which it has entered. There are problems with this. First of all, the sun's rays include longer wavelengths which carry the majority of thermal heat. Except for that which is directly reflected from a very "shiny" surface, which is mostly the shorter wavelengths that carry relatively little heat, prior art devices actually trap heat inside the automobile which heats up the air inside and the shade material as well. This is the phenomenon commonly known as the "greenhouse effect."

Another problem with prior art devices is that most automobiles, as previously mentioned, have at least some tinting designed to absorb the sun's heat to prevent it from entering the car. The undesirable side effect is that the windshield glass itself heats up correspondingly. This is not a problem, typically, when the car is moving. However, when the car is not moving, the glass gets very hot and tinting actually adds to the heating of the air inside.

Thus, there is a need in the art for providing an apparatus and method for covering windows on vehicles such that, among other things, light is prevented from entering the vehicle and heating the air inside.

SUMMARY OF THE INVENTION

Accordingly, the portable external cover apparatus and method of the present invention includes, in a vehicle with at least one window, a portable external cover apparatus, the apparatus including a central connection section. A securing device is connected to the central connection section for securing the central connection section to the vehicle. Reinforcement is provided in the securing device for preventing the removal of the securing device from the vehicle. At least one cover extension is connected to the central connection section for covering the window. A collapsible, shape maintaining rim is attached to the cover extension.

In another aspect of the invention, the securing device further includes a pair of oppositely positioned securing straps with first and second ends. The first ends are attached to the central connection section and the second ends are conformed to removably attach to each other. In another aspect of the invention, the reinforcement is attached to one of the second ends, runs through the central connection section and terminates in the other of the second ends. In a further aspect of the invention, removably attachable attachment devices are provided on the second ends for joining the second ends together. In another aspect of the invention, the reinforcement is metal and in another aspect, the reinforcement is piano wire.

In a still further aspect of the invention, secondary attachment devices are connected to the cover extension for removably attaching the cover extension to the vehicle. In one aspect of the invention, secondary attachment devices include suction devices and in another aspect, the secondary attachment device includes magnetic devices.

In a further aspect of the invention, the vehicle includes a number of windows and a corresponding number of cover extensions connected to the central connection section and the cover extensions are conformed to cover these windows as well. In another aspect of the invention, reflection material is added to the cover extension and, in still another aspect of the invention, reflection material is added to the entire cover apparatus. In a further aspect of the invention, waterproof material is added to the entire cover apparatus.

In another preferred embodiment, in an automobile/truck with front, rear and side windows, an external cover apparatus for the automobile/truck includes a central connection section. A securing device is connected to the central connection section, the securing device including two securing arms with first and second ends wherein the first ends are connected to the central connection section and the second ends are conformed to removably attach to each other. Reinforcement is provided in the securing device conformed to prevent unauthorized removal of the securing device from the automobile/truck. Front and rear window cover extensions are connected to the central connection section for covering the front and rear windows. A collapsible, shape maintaining rim is attached to the front and rear window cover extensions.

In one aspect of this invention, side window cover extensions are connected to the central connection section. In another aspect of the invention, magnets are added to the front and rear window extensions and conformed to contact metal parts of the automobile/truck. In another aspect of the invention, suction cups are provided in the front and rear window extensions and conformed to contact the automobile/truck. In a further aspect of the invention, the apparatus is conformed to reflect light and repel moisture.

In another embodiment of the invention, in an automobile/truck with windows and an exterior roof, a method for covering the exterior side of the windows includes the steps of providing a central cover connection section. A pair of oppositely positioned attachment straps are connected by a first attached end to the central cover connection section. Reinforcement is added to the attachment straps. A number of window cover extensions are connected to the central cover connection section so as to cover all the windows on the automobile/truck. A collapsible, shape maintaining rim is attached to the window cover extensions. The central cover connection section is then placed on the exterior roof of the automobile/truck. The second free ends of the attachment straps are connected together inside the automobile/truck. The exteriors of the windows are then covered with the window cover extensions.

In further aspects of this invention, reflective and waterproof materials are added to the window cover extensions and secondary attachment devices are added to the window cover extensions, selected from a group including magnets and suction cups, and the secondary attachment devices are connected to the exterior of the automobile/truck.

DESCRIPTION OF THE DRAWINGS

Other objects, features, and advantages of the present invention will become more fully apparent from the following detailed description of the preferred embodiments, the appended claims and the accompanying drawings in which:

DETAILED DESCRIPTION OF THE INVENTION

The preferred embodiment of the present invention is illustrated by way of example in FIGS. 1–5. With specific reference to FIG. 1, the portable external cover apparatus 10 of the present invention includes central connection section 12. Securing device 14 is connected to central connection section 12. Reinforcement 16 is provided in securing device 14. Cover extension(s) 18 are connected to central connection section 12. Finally, collapsible, shape maintaining rim 20 is attached to the cover extension(s) 18.

Figure 1:
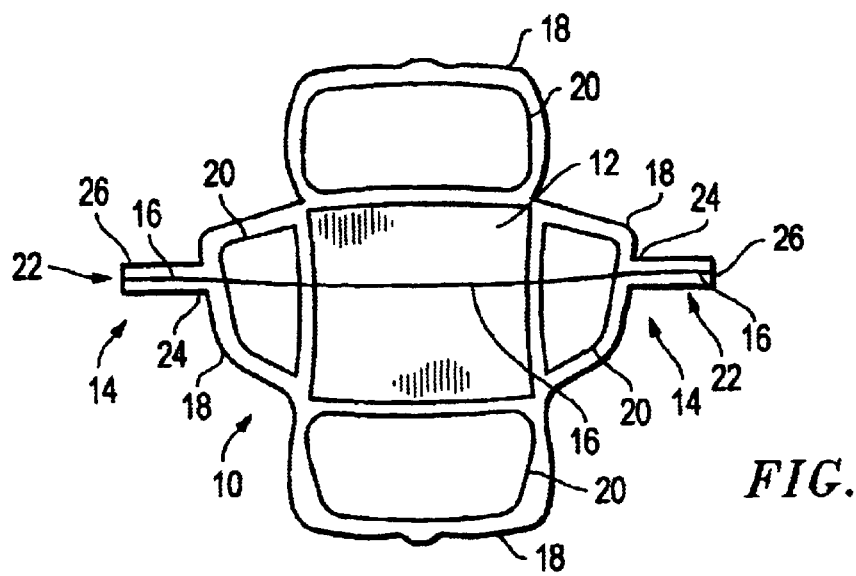
FIG. 1 is a top plan view of the portable external cover apparatus of the present invention.
Figure 2A:
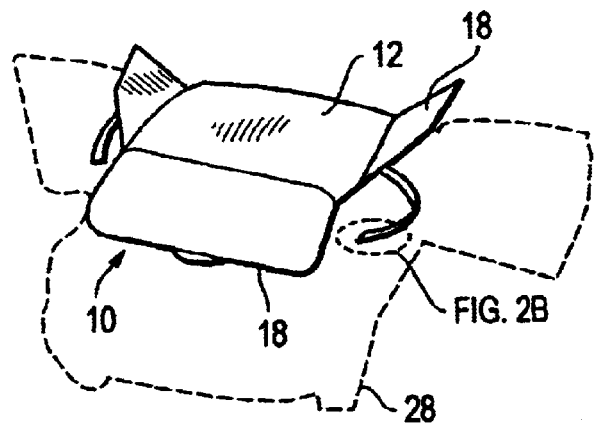
FIG. 2A is a rear perspective view of the invention of FIG. 1 shown in place on a vehicle (shown in dotted lines) and FIG. 2B is an enlarged view illustrating the internal connection of the securing straps of the invention.
Figure 2B:
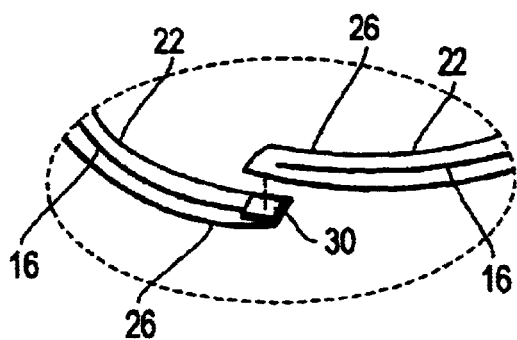

As shown in FIG. 1, and as more clearly shown in FIGS. 2A and 2B, securing device 14 includes, in a preferred embodiment, a pair of oppositely positioned securing straps 22 with first ends 24 and second ends 26. As shown in FIG. 1, first ends 24 are connected to central connection section 12. As shown in FIGS. 2A and 2B, second ends 26 are free to be connected, in any manner now known or hereafter developed, inside vehicle 28. In a preferred embodiment, hook and loop material 30 is added to the second ends 26 so as to enable second ends 26 to be removably attachable to one another. Certainly, any appropriate locking mechanism, snap, clip, or the like is within the scope of the invention.

Still referring to FIG. 2A, portable external cover apparatus 10 is shown with central connection section 12 placed on top of the exterior roof of vehicle 28. One cover extension 18 is shown covering the rear window of vehicle 28. The dotted lines of FIG. 2A illustrate the doors of vehicle 28 in an open position allowing securing device 14, second ends 26 to be connected, by hook and loop material 30 or otherwise, on the interior of vehicle 28. Additional cover extensions 18 are shown in a raised position such that the doors of vehicle 28 may be shut and then cover extensions 18 allowed to cover the exterior of the side windows of vehicle 28 as well.

Referring again to FIG. 1, it should be pointed out that in a preferred embodiment, reinforcement 16 is attached to one of the second ends 26, extends through the central connection section 12 and terminates in the other of the second ends 26 in a continuous uninterrupted manner. In a preferred embodiment, reinforcement 16 is made of some sturdy, tamper resistant material or metal. In a preferred embodiment, reinforcement 16 is piano wire.

In a further embodiment of the invention, cover extensions 18 are coated with or made from highly reflective material. Any highly light reflective material now known or hereafter developed is appropriate. Additionally, in a preferred embodiment the entire portable external cover apparatus 10 is covered with or made from this light reflective material. Still further, in a preferred embodiment, portable external cover apparatus 10 is covered with or made from a water repellant material known in the art.

Figure 3A:
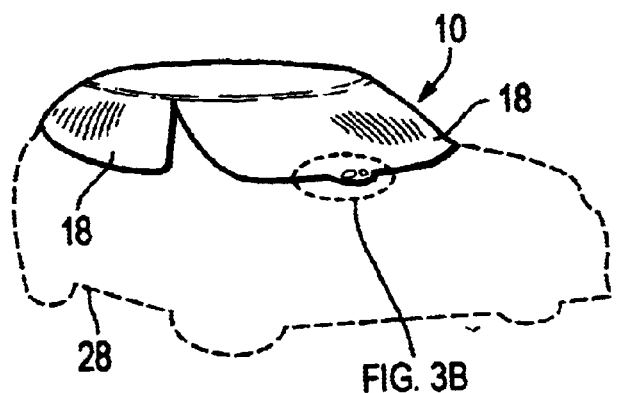
FIG. 3A is a front perspective view of the invention of FIG. 1 shown in place on a vehicle (shown in dotted lines) and FIG. 3B is an enlarged view illustrating suction cups/magnets connected to the window cover extension of the invention of FIG. 1.
Figure 3B:
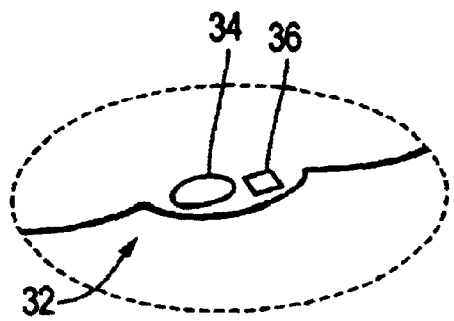

Referring now to FIGS. 3A and 3B, the portable external cover apparatus 10 of the present invention is shown in place on vehicle 28 with the vehicle in a closed parked condition. That is, the doors of vehicle 28 have been shut and cover extensions 18 are shown covering the right side windows and the front window of vehicle 28.

Referring specifically to FIG. 3B, another preferred embodiment of the invention includes secondary attachment devices 32. Secondary attachment devices 32 serve the purpose of securing cover extensions 18 to the exterior of vehicle 28. In one embodiment, the secondary attachment device is a suction device 34. Suction device/cup 34 is any flexible suction cup now known or hereafter developed. Advantageously, suction cup 34 when attached to cover extensions 18 enable cover extensions 18 to be held in place on any particular part of vehicle 28, metal or glass.

In another embodiment, secondary attachment device 32 is a magnet 36. Any type of magnet device now known or hereafter developed is appropriate. Magnet 36 is connected to cover extensions 18 in any appropriate place such that magnet 36 comes in contact with the metal portion of vehicle 28. As illustrated, it may be that both suction cup 34 and magnet 36 are connected to cover extensions 18 so as to provide the user with as many options as possible for securing cover extensions 18 in place over the exterior of the windows of vehicle 28. Certainly, any other type of secondary attachment device 32, now known or hereafter developed is appropriate.

Figure 4:
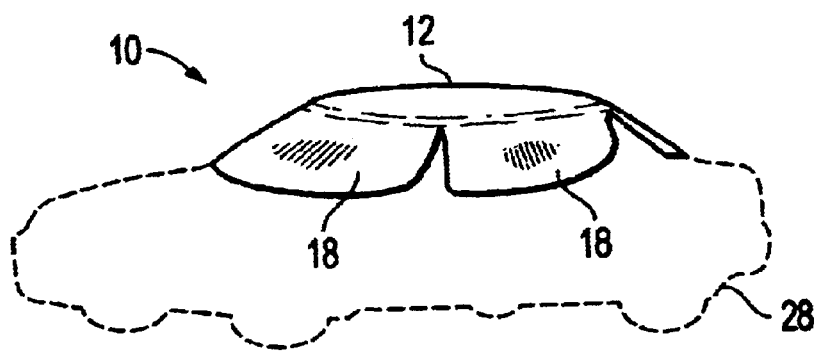
FIG. 4 is a front/side perspective view of the portable external cover apparatus of the present invention shown in place on a vehicle (shown in dotted lines)
Figure 5A:
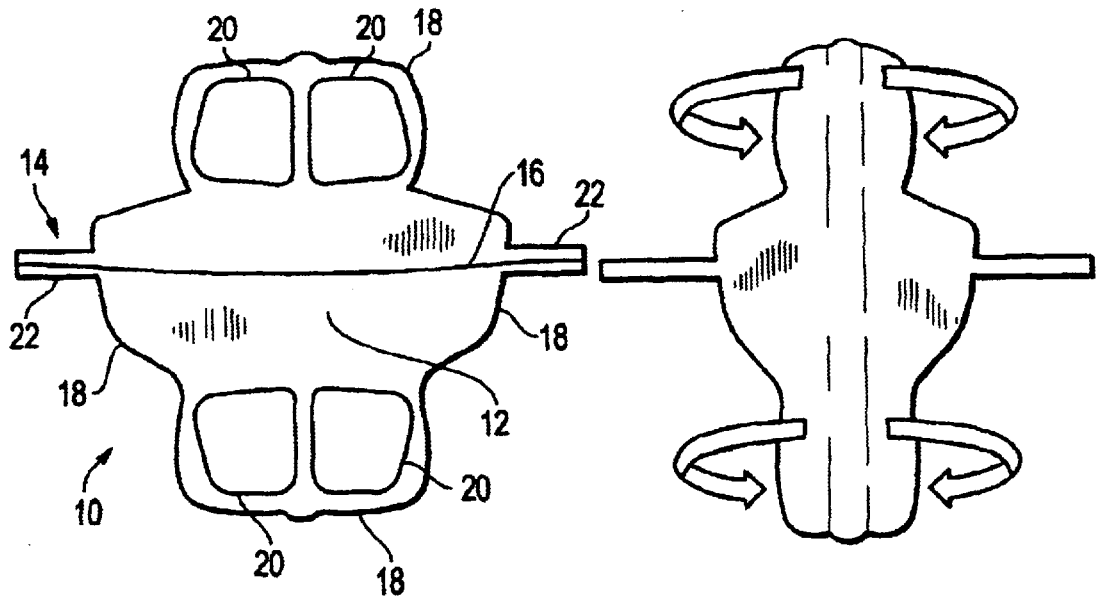
FIG. 5 is an illustration of the invention of the Figures shown being folded from "start" at Step "A" to "finish" at Step "E" and shown in its collapsed folded form.
Figure 5B:
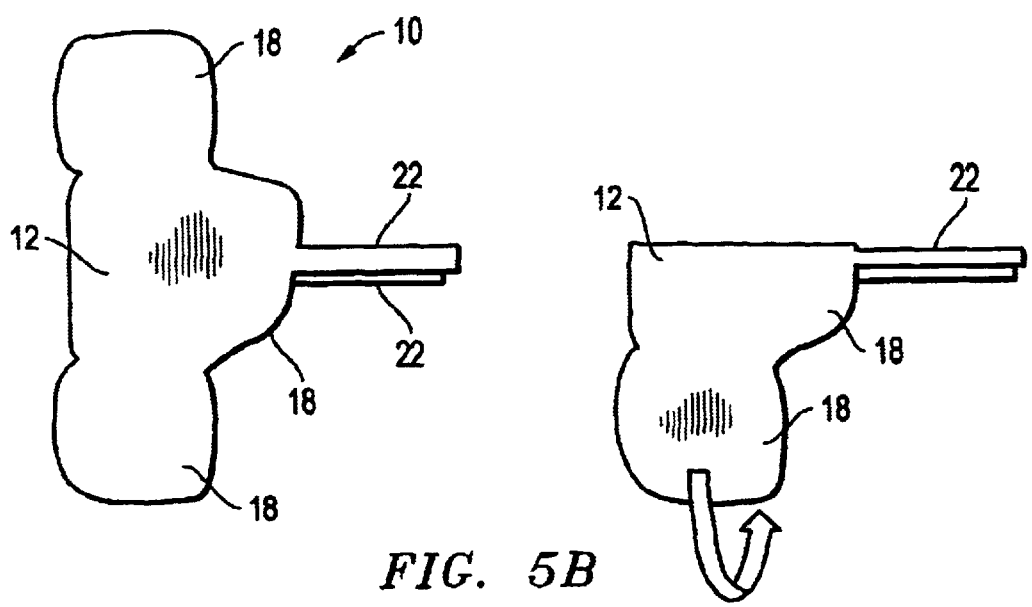
Figure 5C:
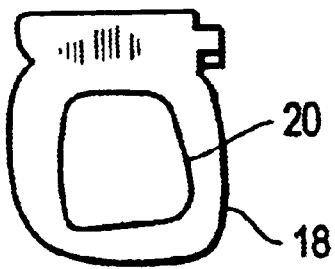
Figure 5D:
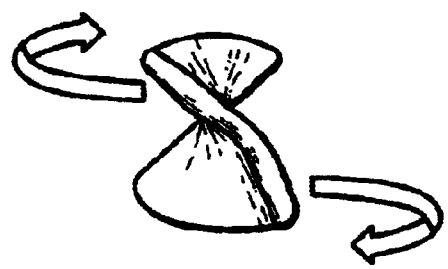
Figure 5E:
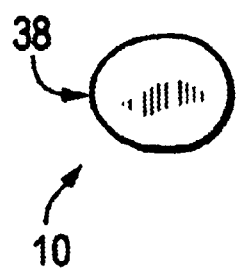

FIG. 4 shows the opposite side of vehicle 28 from the side shown in FIGS. 3A and 3B. Vehicle 28 is illustrated in the form of a passenger automobile. Certainly any automobile, truck, or the like is capable of benefitting from the portable external cover apparatus 10 of the present invention.

FIG. 5 illustrates another advantage of the portable external cover apparatus 10 of the present invention and that is its portability and collapsability. As previously mentioned, collapsible shape maintaining rim 20 is provided within portable external cover apparatus 10. Collapsible shape maintaining rim 20 may be formed from any resilient, bendable, material such as metal. As is known in the art, the loops of collapsible rim 20 are grasped, twisted (See FIG. 5, step "D"), and folded together to form a compact unit 38. Compact unit 38 can then be stored in the trunk of vehicle 28 and taken out and reused when necessary at a later time.

By way of further explanation, applicant's portable external cover apparatus 10 is easily installed and secured onto the outside of a vehicle 28. It can be made of any suitable lightweight, cloth-like material and preferably has reflective material on the cover extensions 18 that coincide with the front windshield and rear windows of vehicle 28, and optionally with side windows of vehicle 28 as well. The portable external cover apparatus 10 preferably is a one-piece design, custom designed for different styles and sizes of cars, trucks, and the like, as needed.

Central connection section 12 is designed to lay on top of the exterior roof of vehicle 28 as illustrated. Central connection section 12 can also be reflective, as previously described. Cover extensions 18 are connected to central connection section 12 such that in use, cover extensions 18 are aligned with the appropriate windows of vehicle 28. Again, portable external cover apparatus 10 preferably includes collapsible shape maintaining rims 20 which may be made of thin spring steel for example. Collapsible shape maintaining rims 20 maintain the shape of cover extensions 18 while in use over windows of vehicle 28.

The primary retainer and theft deterrent mechanism of the invention is the securing device 14 which, in a preferred embodiment, includes a pair of oppositely positioned securing straps 22. The straps 22 are long enough so that when the portable external cover apparatus 10 is in place on the exterior roof of vehicle 28, the second ends 26 reach through the open doors of vehicle 28 and attach taughtly together on the inside of the vehicle 28 (See FIGS. 2A and 2B). When the doors of vehicle 28 are closed, the point of connection of the strap ends 26 cannot be reached by a potential thief As previously discussed, the integrity of the straps 22 and the attachment of second ends 26 can be to whatever degree is determined to be necessary. That is, straps 22 are of any strong material such as nylon webbing and may preferably include reinforcement 16, such as steel piano wire.

To assist in holding the portable external cover apparatus 10 in place in windy conditions, cover extensions 18 preferably include secondary attachment devices 32 such as suction cups 34 and/or magnets 36.

The description of the present embodiments of the invention have been presented for purposes of illustration but are not intended to be exhaustive or to limit the invention to the form disclosed. By way of further example and not by limitation, portable external cover 10 also serves to protect a vehicle's windows from dirt, dust, pollen, insects, tree sap, bird droppings, rain, ice and snow. Many modifications and variations will be apparent to those of ordinary skill in the art. As such, while the present invention has been disclosed in connection with the preferred embodiments thereof, it should be understood that there may be other embodiments which fall within the spirit and scope of the invention as defined by the following claims.

What is claimed is:

1. In a vehicle with at least one window, a portable external cover apparatus for said vehicle, said apparatus comprising:

(a) a central connection section;

(b) securing means connected to said central connection section for securing said central connection section to said vehicle wherein said securing means further comprises, a pair of oppositely positioned securing straps with first and second ends, said first ends attached to said central connection section and said seconds ends conformed to removably attach to each other;

(c) reinforcement means in said securing means for preventing removal of said securing means from said vehicle wherein said reinforcement means is attached to one of said second ends runs through said central connection section and terminates in the other of said second ends;

(d) at least one cover extension connected to said central connection section for covering said window; and (e) a collapsible, shape maintaining rim attached to said cover extension.

2. The apparatus of claim 1 wherein said securing means further comprises: (a) a pair of oppositely positioned securing straps with first and second ends; (b) said first ends attached to said central connection section; and (c) said seconds ends conformed to removably attach to each other.

3. The apparatus of claim 2 wherein said reinforcement means is attached to one of said second ends, runs through said central connection section and terminates in the other of said second ends.

4. The apparatus of claim 1 further comprising removably attachable attachment means on said second ends for joining said second ends together.

5. The apparatus of claim 1 wherein said reinforcement means is metal.

6. The apparatus of claim 1 wherein said reinforcement means is piano wire.

7. The apparatus of claim 1 further comprising secondary attachment means connected to said cover extension for removably attaching said cover extension to said vehicle.

8. The apparatus of claim 7 wherein said secondary attachment means comprise suction devices.

9. The apparatus of claim 7 wherein said secondary attachment means comprise magnetic devices.

10. The apparatus of claim 1 wherein said vehicle includes a plurality of windows and a corresponding plurality of cover extensions attached to said central connection section such that said plurality of cover extensions cover said plurality of windows.

11. The apparatus of claim 1 further comprising reflection material on said cover extension.

12. The apparatus of claim 1 further comprising reflection material on said cover apparatus.

13. The apparatus of claim 1 further comprising water proof material on said cover apparatus.

14. In a vehicle with front, rear and side windows, an external cover apparatus for said vehicle, the apparatus comprising:

(a) a central connection section;

(b) a securing device connected to the central connection section, the securing device including two securing arms with first and seconds ends wherein the first ends are connected to the central connection section and the seconds ends are conformed to removably attach to each other;

(c) reinforcement in the securing device conformed to prevent unauthorized removal of the securing device from the vehicle wherein the reinforcement is attached to one of the second ends, runs through the central connection section and terminates in the other of the second ends;

(d) front and rear window cover extensions connected to the central connection section for covering the front and rear windows; and (e) a collapsible, shape maintaining rim attached to the front and rear window cover extensions.

15. The apparatus of claim 14 further comprising side window cover extensions connected to the central connection section.

16. The apparatus of claim 14 further comprising magnets in the front and rear window extensions conformed to contact metal parts of the vehicle.

17. The apparatus of claim 14 further comprising suction cups in the front and rear window extensions conformed to contact the vehicle.

18. The apparatus of claim 14 wherein the apparatus is conformed to reflect light and repel moisture.

19. In a vehicle with windows and an exterior roof, a method for covering the external side of the windows, the method comprising the steps of:

(a) providing a central cover connection section;

(b) attaching a pair of oppositely positioned attachment straps by a first attached end to the central cover connection section;

(c) adding reinforcement to the attachment straps wherein the reinforcement is attached to a second end of one of the straps, runs through the central connection section and terminates in a second one of the other of the straps;

(d) connecting a number of window cover extensions to the central cover connection section sufficient to cover all the windows on the vehicle;

(e) attaching a collapsible, shape maintaining rim to the window cover extensions;

(f) placing the central cover connection section on the exterior roof of the vehicle;

(g) connecting the second ends of the attachment straps together inside the vehicle; and (h) covering the external side of the windows with the window cover extensions.

20. The method of claim 19 further comprising the steps of:

(a) adding reflective and water proof material to the window cover extensions;

(b) adding secondary attachment devices to the window cover extensions selected from a group including magnets and suction cups; and (c) connecting the secondary attachment devices to the vehicle.

* * * * *